(No Model.)

T. R. CRANE.
COMBINED SEED AND FERTILIZER DISTRIBUTER.

No. 555,897. Patented Mar. 3, 1896.

WITNESSES :-
L. J. Van Horn.
C. Calvert Hines.

INVENTOR :-
Thos R. Crane
By Chas B. Mann
ATTORNEY.

United States Patent Office.

THOMAS R. CRANE, OF BALTIMORE, MARYLAND, ASSIGNOR TO ELIZABETH E. CRANE, OF HEATHSVILLE, VIRGINIA.

COMBINED SEED AND FERTILIZER DISTRIBUTER.

SPECIFICATION forming part of Letters Patent No. 555,897, dated March 3, 1896.

Application filed July 20, 1895. Serial No. 556,551. (No model.)

*To all whom it may concern:*

Be it known that I, THOMAS R. CRANE, a citizen of the United States, residing at Baltimore, in the State of Maryland, have invented certain new and useful Improvements in a Combined Seed and Fertilizer Distributer, of which the following is a specification.

This invention relates to an improved seed and fertilizer distributer, the parts of which are so combined that in operation the fertilizer when in the ground will not be in contact with the seed, this separation of the seed and fertilizer obviating injury to the germ of the seed.

Figure 1:
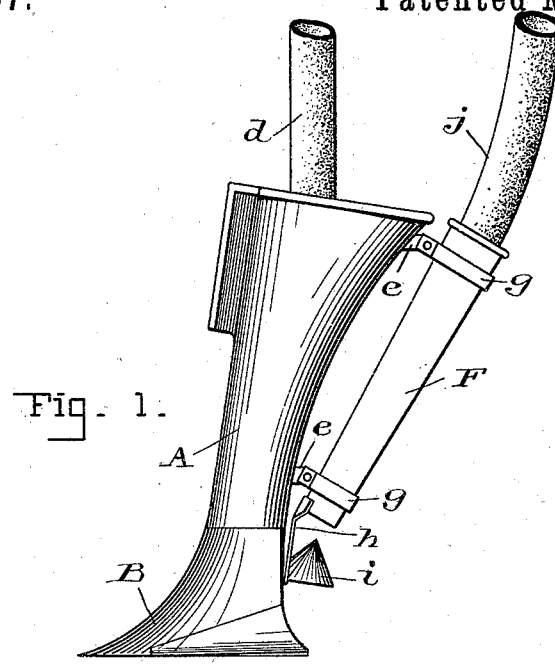
Figure 2:
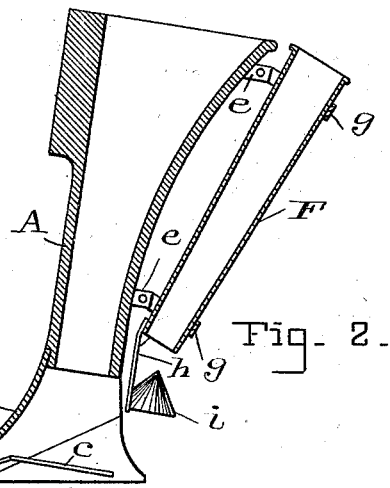
Figure 3:
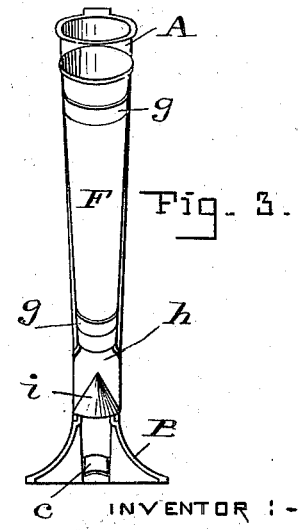

In the accompanying drawings, Figure 1 is a side view of a grain or seed drill boot and a fertilizer-supply tube attached thereto according to my invention. Fig. 2 is a vertical section of the same. Fig. 3 is a rear view of the two parts shown in Fig. 2.

The seed-drill comprises the boot A, having the plow-shoe B, and the grain spreader or prong c, secured within the plow-shoe. This device is well known, and is secured below the seed hopper or box (not shown) of a grain-drill. A tube d leads from the hopper or box down into the boot A. Attached to the boot A at the rear are lugs e, and a fertilizer-supply tube F is secured by straps or bands g around it and made fast to said lugs e. The tube F has at its lower end a hanger h, which supports a cone i, the point of the cone being uppermost and directly below the open end of the said tube. The location of the cone is at the rear of the plow-shoe B. A tube j leads down from the fertilizer-box (not shown) into the top of the tube F.

The operation of the combined device is as follows: The seed or grains pass down the boot A and strike upon the spreader-prong c in the shoe, and thereby the grains are scattered and drop broadcast in the flat-bottom of the furrow in the earth. The shape of the plow-shoe B produces this flat-bottomed furrow. The forward movement of the plow-shoe allows a small quantity of earth to fall on and cover these broadcast seed, and then the fertilizer, passing down the tube F, is scattered or spread by the cone i upon the earth which covers the seed and to the same width as the flat furrow whereon the seed has been distributed, and, finally, more earth falls and covers the fertilizer and also the seed to the proper depth. Thus both seed and fertilizer are in the earth adjacent each other, but not in contact, and thereby each separate grain is insured full strength of soil and fertilizer, and there will be no destruction of the germ of any seed in consequence of the fertilizer coming in direct contact with the seed, as is the case where the two are crowded together in a narrow trench, such as the ordinary drill-point makes.

Having thus described my invention, what I claim is—

1. In a combined seed and fertilizer distributer, the combination of a boot and plow-shoe having a grain-spreader; a fertilizer-supply tube secured at the rear of the boot; and a cone whose point is uppermost and directly below the end of the said supply-tube and at the rear of the said plow-shoe, as set forth.

2. In a combined seed and fertilizer distributer, the combination of a boot and plow-shoe having a grain-spreader; and lugs, e, on the rear of the boot; a fertilizer-supply tube at the rear of the boot; straps or bands, g, around the said supply-tube and made fast to the said lugs on the boot; and a cone whose point is uppermost and directly below the end of the said supply-tube and at the rear of the said plow-shoe, as set forth.

In testimony whereof I affix my signature in the presence of two witnesses.

THOMAS R. CRANE.

Witnesses:
   CHARLES B. MANN, Jr.,
   C. CALVERT HINES.